(12) United States Patent
Smith et al.

(10) Patent No.: US 10,583,623 B2
(45) Date of Patent: Mar. 10, 2020

(54) FITMENT HOLDER

(71) Applicant: BBC Packaging, LLC, Hudson, WI (US)

(72) Inventors: David G. Smith, Hudson, WI (US); William D. Rogers, Shakopee, MN (US)

(73) Assignee: BBC PACKAGING, LLC, Hudson, WI (US)

( * ) Notice: Subject to any disclaimer, the term of this patent is extended or adjusted under 35 U.S.C. 154(b) by 0 days.

(21) Appl. No.: 16/169,148

(22) Filed: Oct. 24, 2018

(65) Prior Publication Data
US 2019/0118501 A1    Apr. 25, 2019

Related U.S. Application Data

(60) Provisional application No. 62/576,117, filed on Oct. 24, 2017.

(51) Int. Cl.
| | |
|---|---|
| *B31B 50/84* | (2017.01) |
| *B65B 61/18* | (2006.01) |
| *B65D 75/00* | (2006.01) |
| *B65G 47/90* | (2006.01) |
| *B65D 75/58* | (2006.01) |
| *B65G 15/58* | (2006.01) |
| *B65G 17/42* | (2006.01) |
| *B65B 3/02* | (2006.01) |

(52) U.S. Cl.
CPC ............. *B31B 50/84* (2017.08); *B65B 3/02* (2013.01); *B65B 61/186* (2013.01); *B65D 75/008* (2013.01); *B65D 75/5883* (2013.01); *B65G 15/58* (2013.01); *B65G 47/901* (2013.01); *B65G 17/42* (2013.01); *B65G 2201/0261* (2013.01); *B65G 2207/38* (2013.01)

(58) Field of Classification Search
CPC ........ B65G 2201/02; B65G 2201/0261; B65G 17/32; B65G 17/42; B65G 2207/38; B65G 47/901; B65G 15/58; B31B 50/84; B65B 61/186; B65B 3/02; B65D 75/008; B65D 75/5883
USPC ............. 198/867.11, 867.14, 803.14, 803.15
See application file for complete search history.

(56) References Cited

U.S. PATENT DOCUMENTS

| | | | | |
|---|---|---|---|---|
| 3,265,105 | A * | 8/1966 | Woodruffe-Peacock | ................... B27H 5/10 147/4 |
| 3,342,304 | A * | 9/1967 | Greulich | ................. B65B 35/44 134/82 |
| 5,110,041 | A * | 5/1992 | Keeler | .................... B29C 65/02 220/265 |
| 5,484,052 | A * | 1/1996 | Pawloski | ................ B65B 43/54 198/803.11 |
| 6,311,830 | B1 * | 11/2001 | Grimm | .................. B23Q 7/035 198/477.1 |
| 9,844,846 | B2 * | 12/2017 | Terzini | ................... B23Q 1/032 |

(Continued)

*Primary Examiner* — James R Bidwell
(74) *Attorney, Agent, or Firm* — David M. Breiner; BrownWinick Law Firm (57) ABSTRACT

Disclosed is a fitment holder that includes a base, a hub extending from the base, and a fitment positioning structure comprising a plurality of pins. The plurality of pins may be configured to engage a wing of the fitment and the plurality of pins may include a plurality of heads residing in a plurality of countersunk areas formed in the base. The plurality of pins may also include a plurality of ends extending from a top surface of the base.

12 Claims, 11 Drawing Sheets

(56) References Cited

U.S. PATENT DOCUMENTS

| | | | | |
|---|---|---|---|---|
| 9,994,378 B2* | 6/2018 | Wurster | ............... | B65D 1/0276 |
| 2007/0241151 A1* | 10/2007 | Murray | ................ | B65B 43/465 |
| | | | | 224/407 |
| 2015/0291297 A1* | 10/2015 | Lund | ................... | B65G 47/846 |
| | | | | 198/617 |

* cited by examiner

FITMENT HOLDER

CROSS REFERENCE TO RELATED APPLICATIONS

This application claims priority to U.S. Provisional Application No. 62/576,117 which was filed on Oct. 24, 2017, the entirety of which is incorporated herein fully by reference.

BACKGROUND

1. Field

Example embodiments relate to a holder configured to support a fitment. Example embodiments also relate to a method using the holder to manufacture a product.

2. Description of the Related Art

Figure 1:
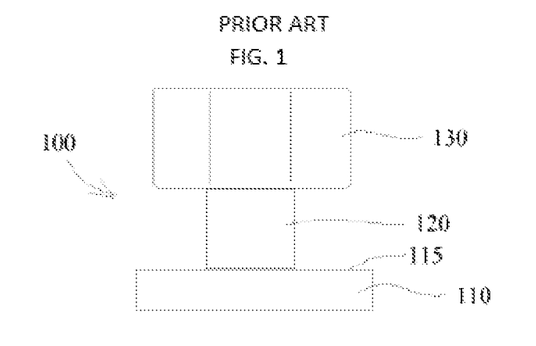
FIG. 1 is a side view of a conventional fitment.
Figure 2:
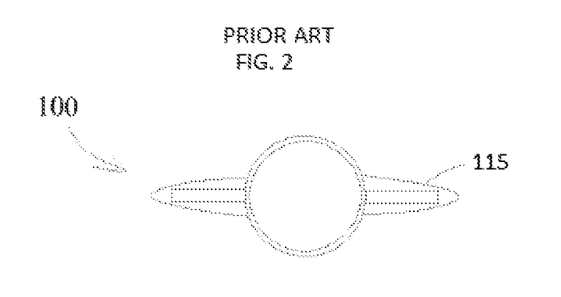
FIG. 2 top view of the conventional fitment.
Figure 3:
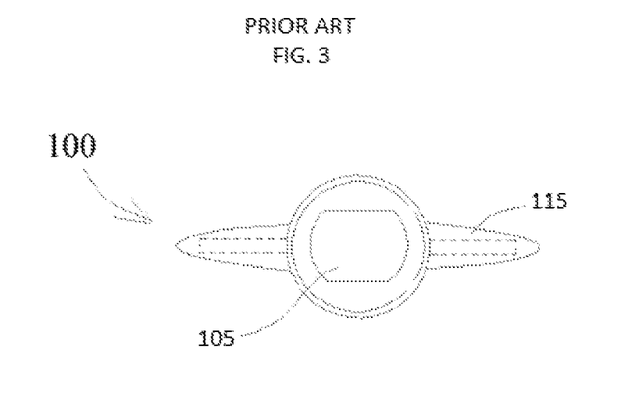
FIG. 3 bottom view of the conventional fitment.

Conveyor systems are commonly used to manufacture desired items. Some systems use conveyors to move items, for example, fitments for juice pouches, from one location to another. FIGS. 1-3, for example, are views of an example fitment 100 often utilized with juice pouches. As one skilled in the art will readily appreciate, there are several fitment configurations, as such, the fitment of FIGS. 1-3 is provided merely for the purpose of illustration. As shown in FIGS. 1-3, the fitment 100 includes a bottom 110, a neck 120, a wing 115, and a top 130. The bottom 110 is often hollow and has a form similar to a barrel. In order to promote efficiency it is desired to have a conveying system that includes a mechanism that orderly moves fitments 100 from one location to another.

SUMMARY

Example embodiments relate to a holder configured to support a fitment. Example embodiments also relate to a method using the fitment holder to manufacture a product.

In at least one nonlimiting example embodiment a fitment holder includes a base, a hub extending from the base, and a fitment positioning structure. The fitment positioning structure may include a plurality of pins configured to engage a wing of the fitment. The plurality of pins may include a plurality of heads residing in a plurality of countersunk areas formed in the base and a plurality of ends extending from a top surface of the base.

BRIEF DESCRIPTION OF THE DRAWINGS

Example embodiments are described in detail below with reference to the attached drawing figures, wherein.

DETAILED DESCRIPTION

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a holder configured to support a fitment. Example embodiments also relate to a method using the fitment holder to manufacture a product.

Figure 4:
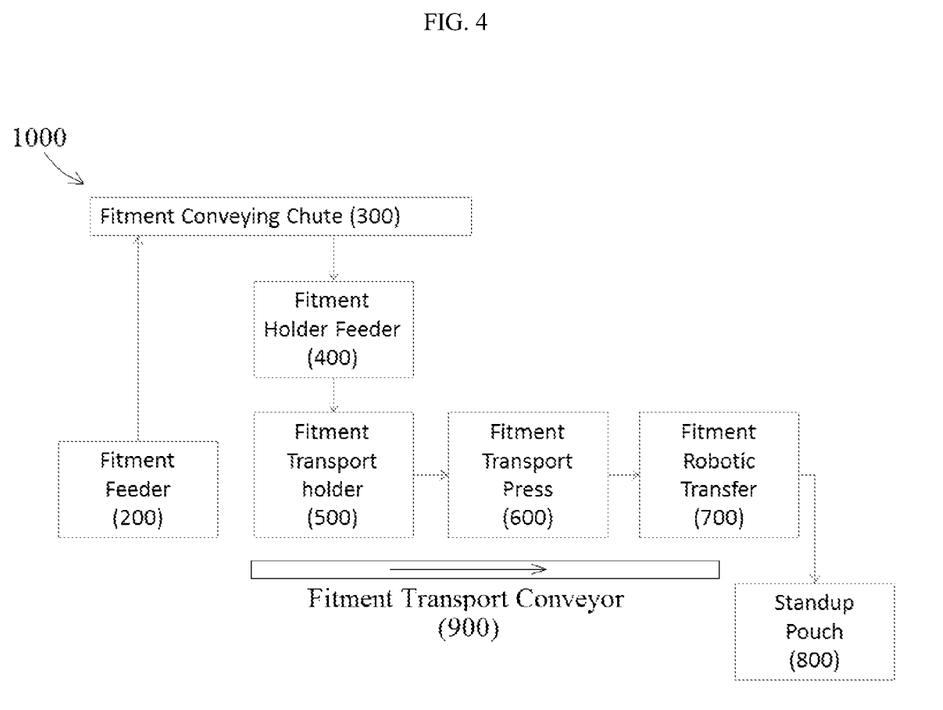
FIG. 4 is a view of a system in accordance with an example of the invention.

FIG. 4 is a view of a system 1000 in accordance with example embodiments. In example embodiments, the system 1000 may be used to insert fitments into standup pouches, for example, juice pouches. As shown in FIG. 4, the system 1000 includes a fitment feeder 200 which may include a plurality of fitments 100. The fitments 100 may be moved from the fitment feeder 200 to a fitment conveying chute 300 which conveys the fitments 100 to a fitment holder feeder 400. The fitments 100 may then be placed on one or more fitment holders 500 secured in place via a fitment transport press 600. The fitment holders 500 are attached to a transport conveyor 900. Operation of the transport conveyor 900 moves the fitment holders 500 with the fitments 100 attached to a fitment robotic transfer 700. The fitments 100, using the fitment robot transfer 700, may be moved to other equipment for assembly of a fitmented standup pouch 800. It is understood that while the system 1000 is described as a system for fitmenting standup pouches, the system is exemplary in nature and may be used to manufacture a number of desired items.

Figure 5:
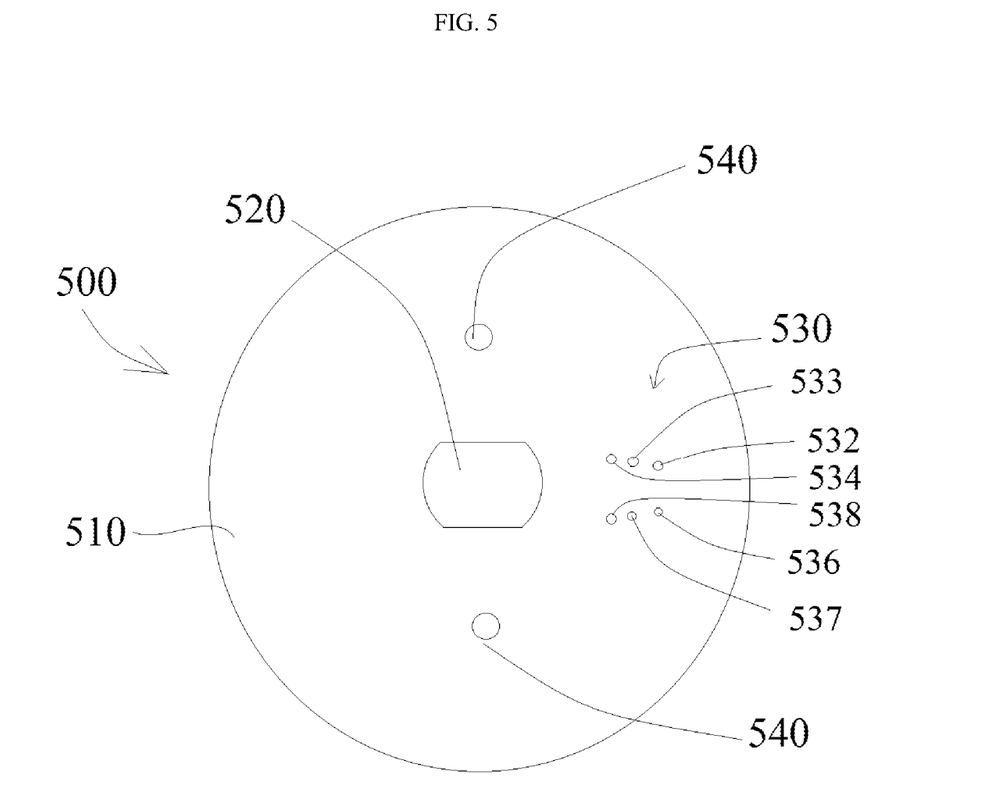
FIG. 5 is a top view of a fitment holder in accordance with an example of the invention.
Figure 6:
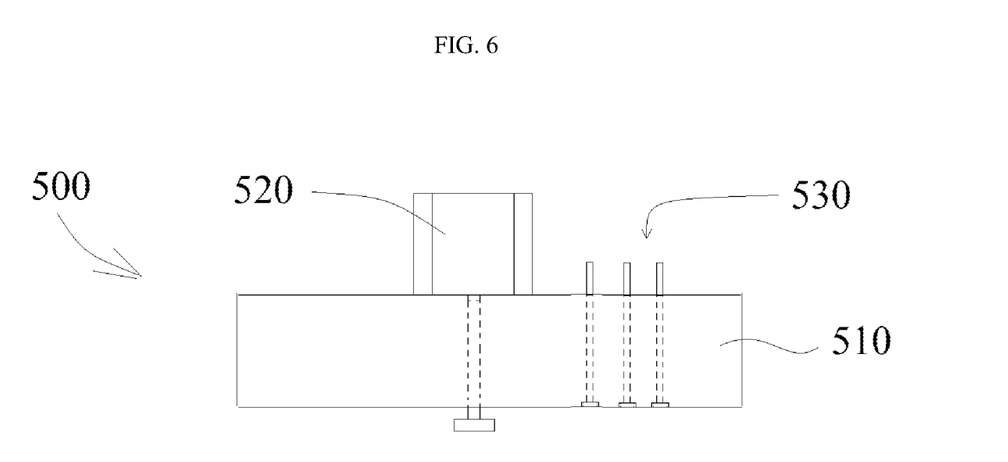
FIG. 6 is a side view of the fitment holder in accordance with an example of the invention.
Figure 7:
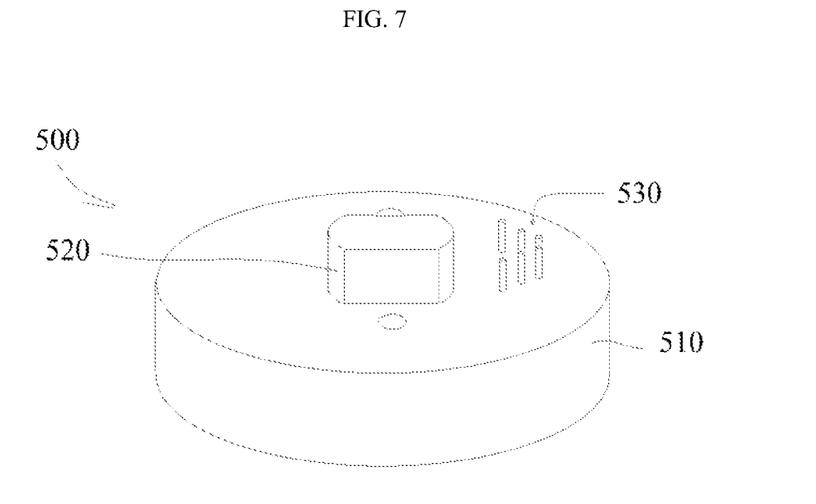
FIG. 7 is a perspective view of the fitment holder in accordance with an example of the invention.

FIG. 5 is a top view of a fitment holder 500 in accordance with example embodiments. FIG. 6 is a side view of the fitment holder 500 and FIG. 7 is a perspective view of the fitment holder 500. As shown in FIGS. 5-7, the fitment holder 500 may include a base 510, a hub 520, and a fitment positioning structure 530. The hub 520 may be sized to match a barrel of the fitment 100 so that the fitment 100 may be secured to the fitment holder 500. The barrel of the fitment 100 may include a space 105 which receives the hub 520. The space 105, in one nonlimiting example embodiment, corresponds to a drink opening having a diameter and depth that may accommodate the hub 520. The fitment positioning structure 530 may aid in properly orientating the fitment 100 as it is moved along the conveyor transport 900. For example, the fitment positioning structure 530 may accommodate a wing 115 of the fitment 100. It is understood that the particular shape of the hub 520 is not critical as the shape may vary from one embodiment to another based on the barrel of the fitment 100. For example, if the barrel has a space 105 with a circular cross-section, the hub 520 may have a circular cross-section to fit in the space. As another example, if the cross-section of the space 105 is square, the cross-section of the hub 520 may be square. As yet another example, if the cross-section of the space 105 is elliptical, the cross-section of the hub 520 may be elliptical. Regardless, the hub 520 should be configured to fit into the barrel of the fitment 100 and may be configured to promote a snug fit.

In FIGS. 5-7 the fitment positioning structure 530 is illustrated as being comprised of a plurality of pins. For example, in the nonlimiting example of FIGS. 5-7 the fitment positioning structure 530 is comprised of six pins 532, 533, 534, 536, 537 and 538. Although FIGS. 5-7 illustrates the fitment positioning structure 530 as being comprised of six pins, the number of pins is for purposes of illustration only. For example, the fitment positioning structure 530 may include more than six pins or less than six pins. In yet another embodiment, the pins may be omitted and the fitment positioning structure 530 may resemble pin-like protrusions extending from a top surface of the base 510. Regardless, the fitment positioning structure 530 is configured to accommodate the aforementioned wing 115 to stabilize and orientate the fitment 100 on the fitment holder 500.

Figure 18:
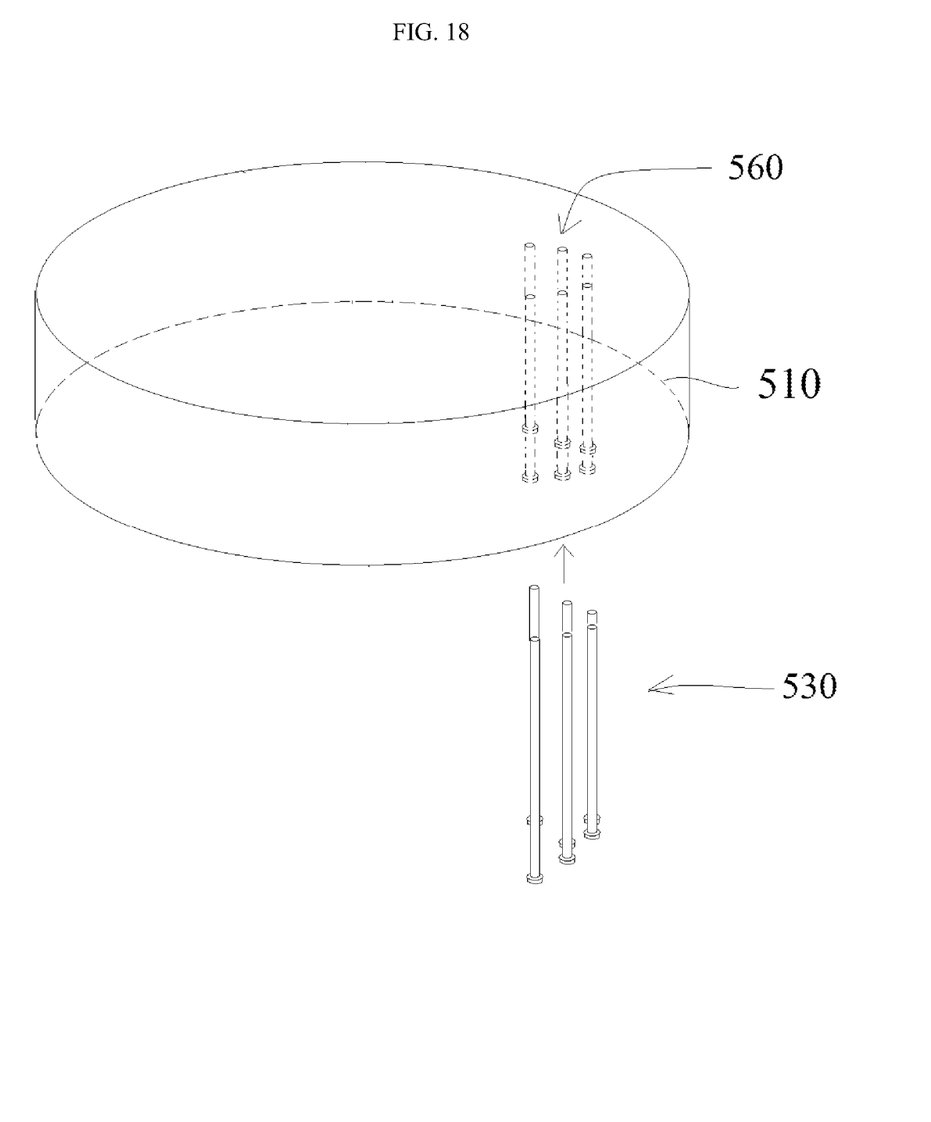
FIG. 18 is a view of a base with a plurality of apertures configured to receive a plurality of pins in accordance with example embodiments.

In example embodiments, the base 510 may have a first plurality of holes 560 configured to receive the pins 532, 533, 534, 536, 537 and 538. The pins 532, 533, 534, 536, 537, and 538 may include heads which prevent the pins 532, 533, 534, 536, 537, and 538 from passing completely through the base 510. In order to promote a flush contact between of the base 510 and a conveyor belt upon which it may rest, the plurality of holes may include a counter sunk portion to accommodate the heads of the pins 532, 533, 534, 536, 537, and 538. FIG. 18 shows an example of the base 510 having the plurality of holes 560 which may be configured to receive the plurality of pins 532, 533, 534, 536, 537, and 538. It is understood that FIG. 18 shows only some of the features of the base 510 rather than all of the features. Certain features are not shown in order to illustrate the plurality of holes 560. In example embodiments, an adhesive may be used to fix the pins 532, 533, 534, 536, 537, and 538 in their respective holes. An advantage of the system designed by the inventor is that when the fitment holder 500 is attached to the conveyer, the pins 532, 534, 536, and 538 cannot back out of their respective holes even if the adhesive fails since the heads of the pins 532, 534, 536, and 538 would be trapped between in the counter sunk portions of the holes 560 by the conveyor belt. This is a clear advantage since a pin detaching from the fitment holder 500 could present an unsafe condition for a consumer. For example, if the pins 532, 533, 534, 536, 537, and 538 are attached to the base 510 by only an adhesive and the adhesive fails, the pins 532, 533, 534, 536, 537, and 538 could fall into a pouch. This could present a choking hazard for a consumer or could destroy machinery. However, the invention of this application does not suffer this potential hazard.

Figure 19:
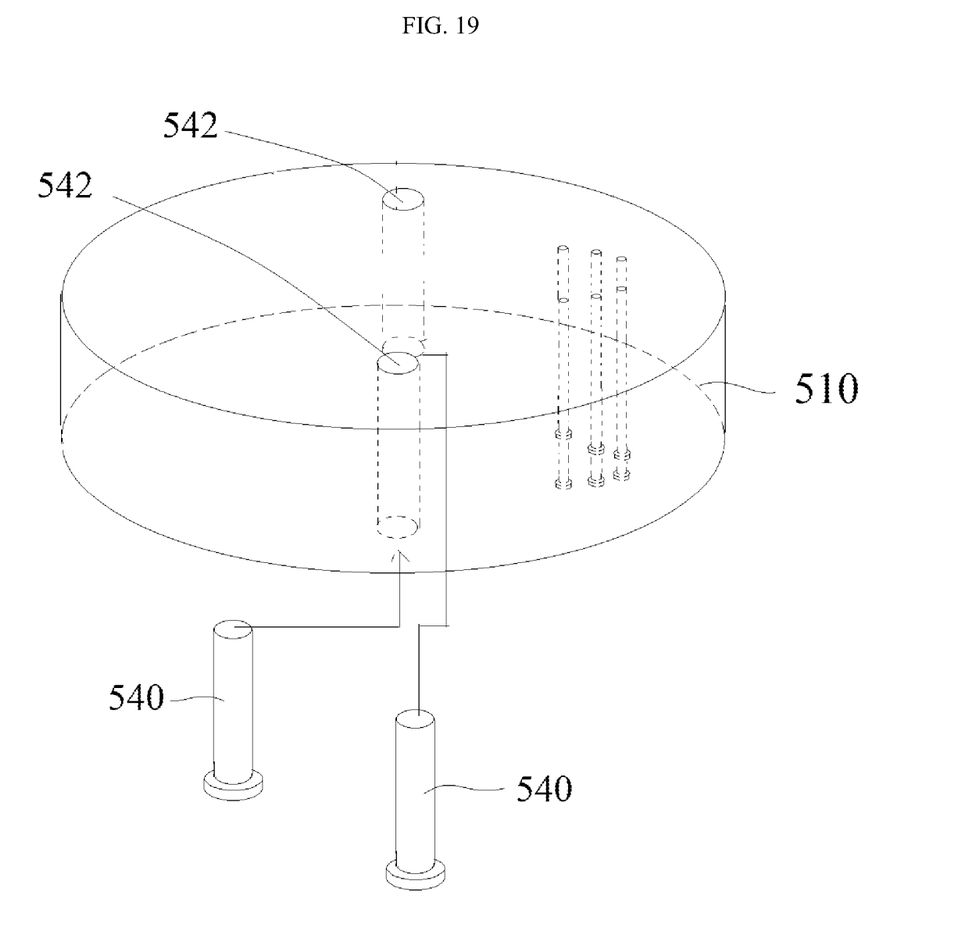
FIG. 19 is a view of a base with a pair of apertures configured to receive a pair of screws.

In example embodiments, the fitment holder 500 may be attached to the conveyor 900 by a conventional means, for example, an adhesive or mechanical fasteners. This may allow for the permanent or removable attachments to the conveyor 900. For example, as shown in FIGS. 5-7, a pair of screws 540 may attach the fitment holder 500 to the fitment transport conveyor belt 900. In example embodiments, the base 510 may include a pair of apertures 542 which may be configured to receive the pair of screws 540. Though not shown in the figures, it is understood the a bushing may be provided within each of the apertures 542 to receive the pair of screws 540. The pair of apertures 542 are illustrated best in FIG. 19. It is understood that FIG. 19 shows only some of the features of the base 510 rather than all of the features. Certain features are not shown in order to illustrate the pair of apertures 542.

Figure 8:
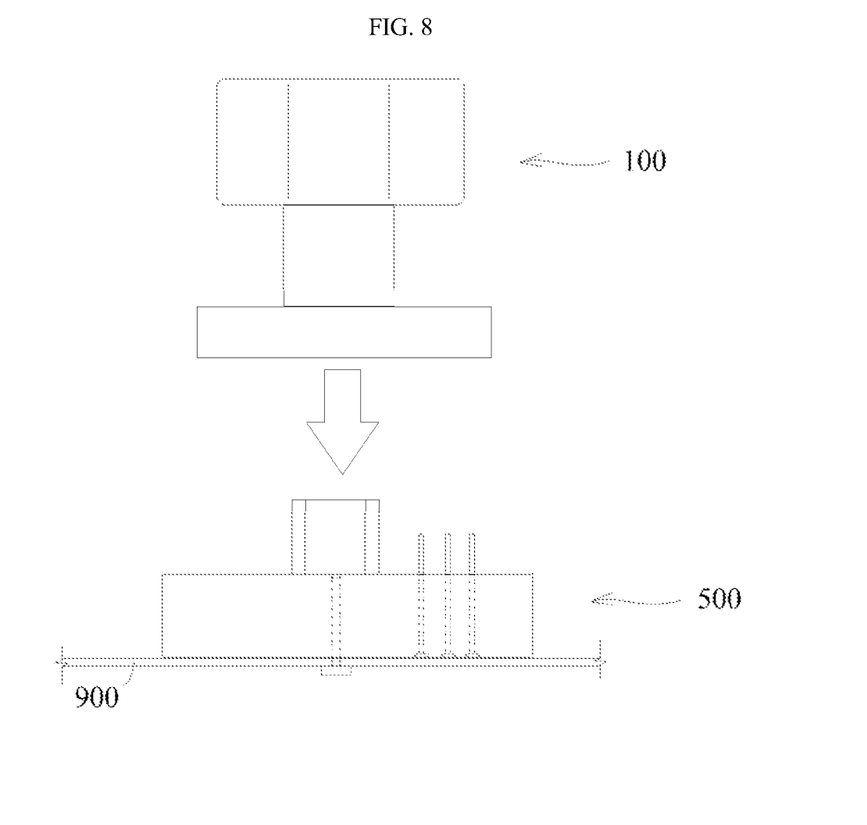
FIG. 8 illustrates a conventional fitment being drawn near the fitment holder in accordance with an example of the invention.
Figure 9:
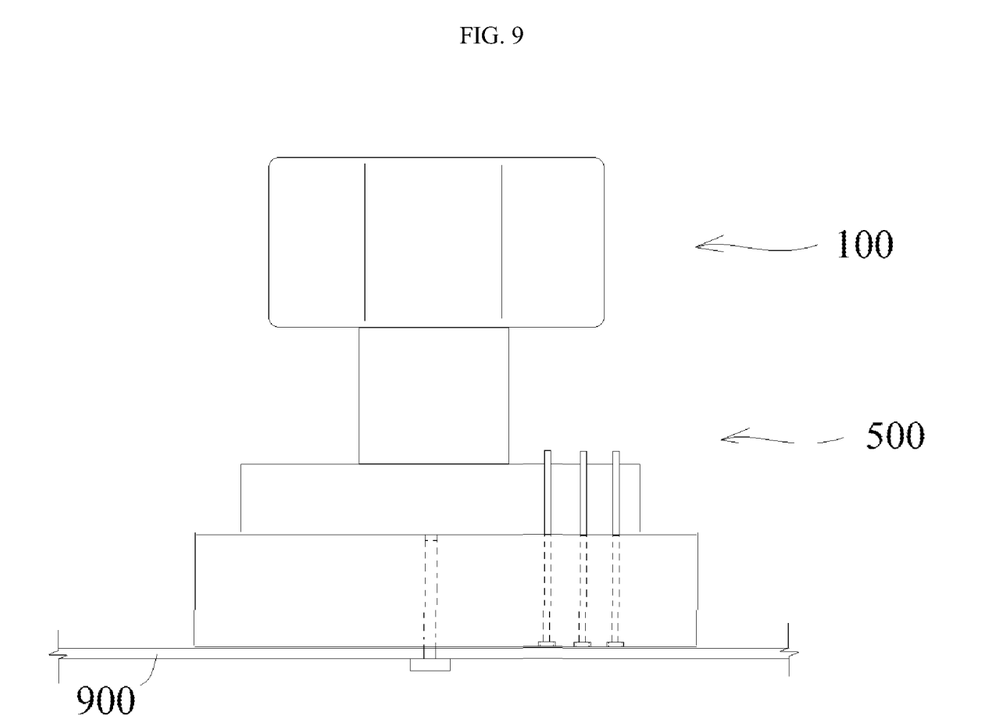
FIG. 9 illustrates a side view of the fitment on the fitment holder in accordance with an example of the invention.
Figure 10:
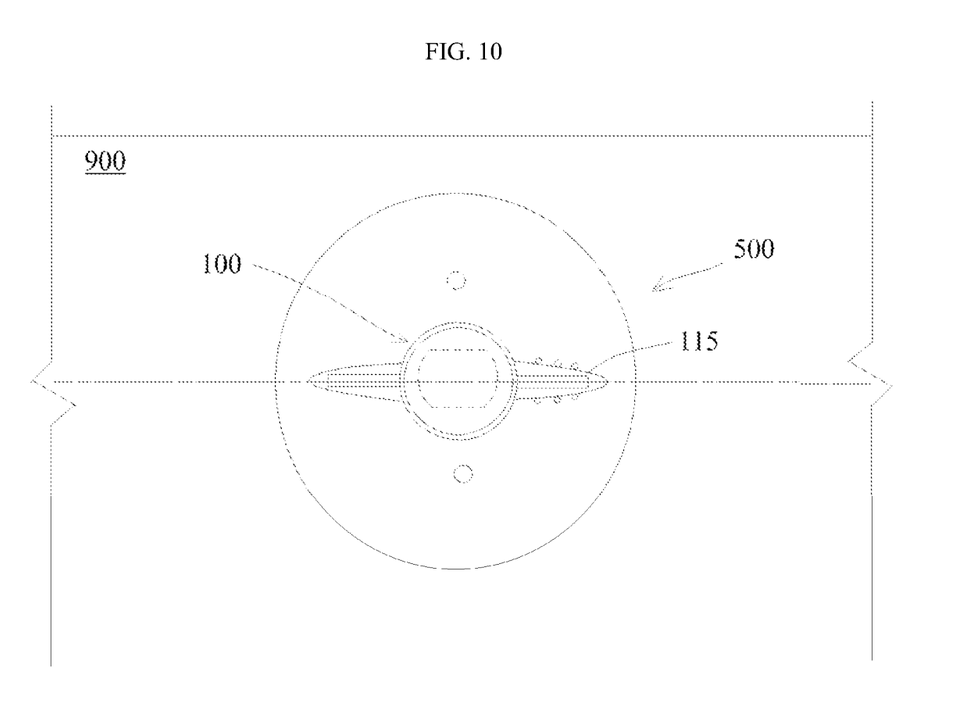
FIG. 10 is a top view of the fitment on the fitment holder in accordance with an example of the invention.

FIGS. 8-10 illustrate a fitment 100 being mounted on the example fitment holder 500. As shown in FIG. 8, the fitment 100 may be moved towards the fitment holder 500 so that hub 520 and the space 105 of the fitment barrel are aligned. In example embodiments, a wing 115 of the fitment 100 is also aligned with the fitment positioning structure 530 so that the wing 115 inserts into the fitment positioning structure 530 as shown in FIGS. 9 and 10. The fitment positioning structure 530 and the hub 520 securely retain the fitment 100 on the fitment holder 500 so that as the fitment holder 500 is moved along conveyer belt 900, the fitment 100 is moved in a desired way. For example, the fitment holder 500 establishes the position of the fitment 100 on the fitment transport conveyer 900 when received from the fitment feeder 200. The fitment holder 500 design fixes the fitment 100 orientation in both the vertical axis and may provide centerline alignment in the direction of travel on the fitment transport conveyer 900. The fitment holder 500 securely holds the fitment 100 in proper horizontal location and vertical orientation for entry into and passage through a fitment transport press 600 that forces the fitment 100 securely on to the fitment holder center hub 520. The fitment holder 500 positioning pins 530 maintain the fitment position and orientation through the press and presentation to the fitment robotic transfer 700. The fitment holder hub 520 locates the fitment 100 on the fitment transport conveyer 900 for proper spacing and orientation for automated hi-speed transport, robotic removal from fitment transport conveyer 900 and then robotic insertion into a pouch that may be moving.

The fitment holder 500 may be a sanitary, food safe device that properly holds a fitment 100 for transport on a conveyor without falling or misalignment thereby ensuring successful use of a robotic fitment pickup and fitment insertion into a high speed pouch filler system. The unique fitment holder 500 design permits all sizes and shapes of fitments to be secured and oriented for transfer. Because of this simplicity of design, 100% construction using food safe materials can be achieved. The fitment holder 500 is a device that can be easily and economically fabricated to accommodate all fitment types. The pin design is non-pullout of unbreakable sanitary material to ensure food safety. The center hub 520 may be machined to match a fitment drink opening diameter and depth ensuring a secure fit during press and transfer operations. The fitment holder 500 may be secured to the fitment transport conveyer 900 using countersunk stainless steel fasteners to ensure smooth travel on the fitment transport conveyer, long life expectancy, and quick change over for varying fitment size and spacing requirements.

Figure 16:
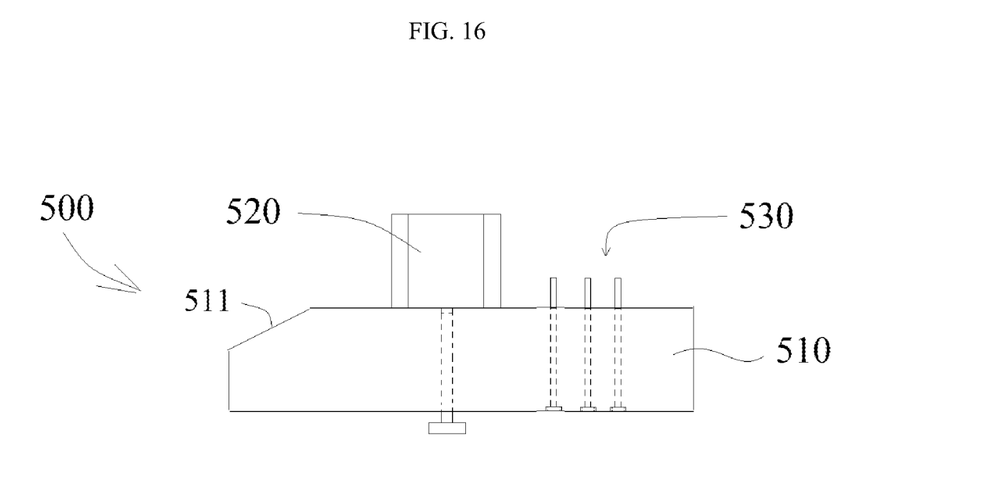
FIG. 16 is a side view of a modified fitment holder in accordance with example embodiments.
Figure 17:
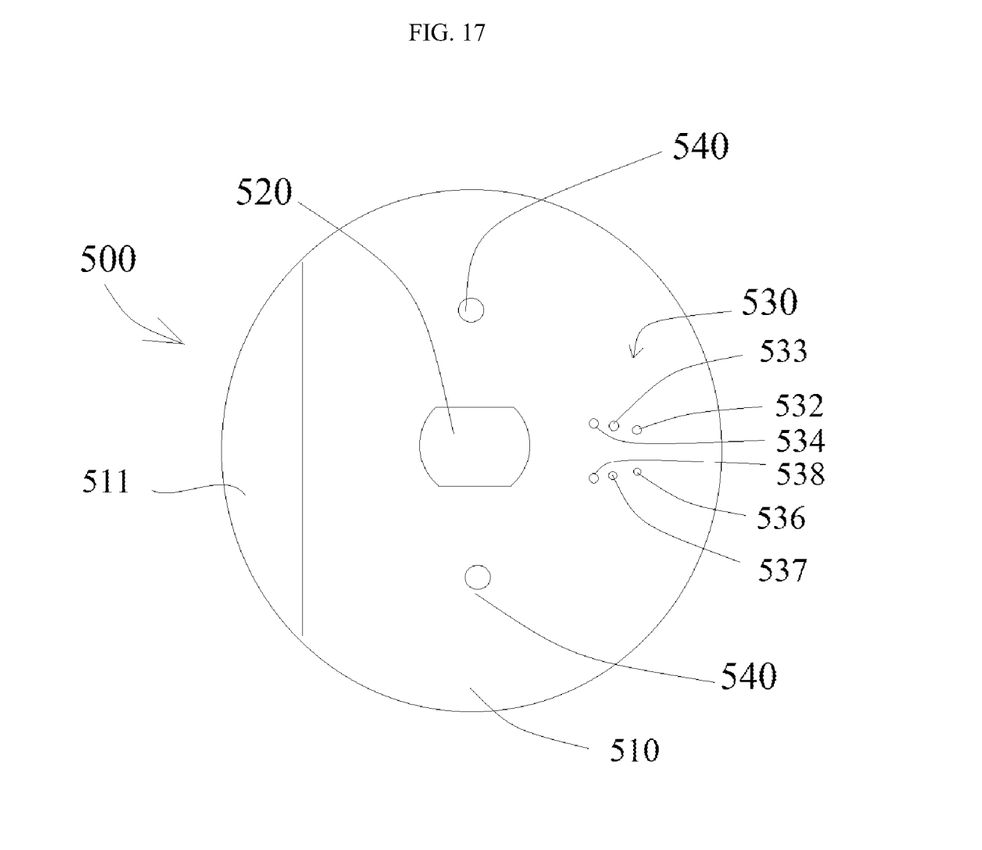
FIG. 17 is a top view of the modified fitment holder in accordance with example embodiments.

The base 510 may be fabricated from a food safe polymeric material of a thickness suitable for base fasteners and the center hub 520 installation. The fasteners attaching the base 510 to the conveyor belt may be countersunk stainless steel for sanitary design. The center hub 520 may also be stainless steel machined to match the internal barrel of the fitments being transferred. Fitment positioning pins may be stainless steel with heads countersunk into bottom of the fitment base 510. Bottom entry of the pins through the base 510 provides "no pull out" design which eliminates problems of adhesive or thread failures. In some embodiments, a leading edge of the base 510 may be beveled to provide as easier flow into the fitment transport press. This bevel may create a sloped surface 511 in the base 510 as best seen in FIGS. 16 and 17.

Figure 11:
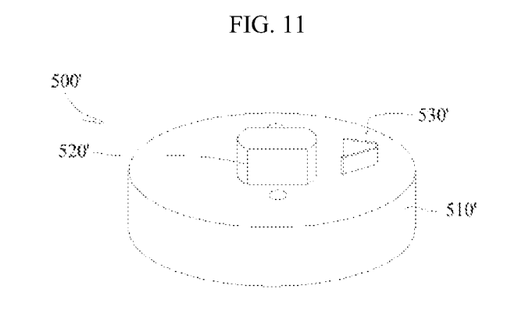
FIG. 11 is a view of a fitment holder in accordance with example embodiments.
Figure 12:
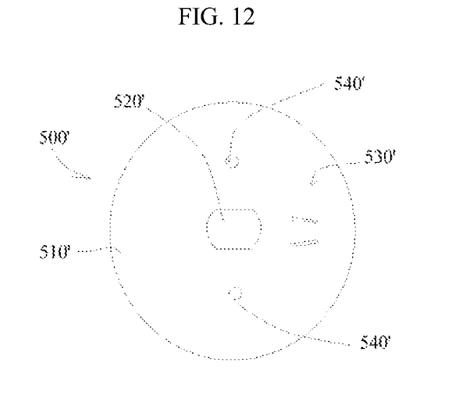
FIG. 12 is a view of a fitment holder in accordance with example embodiments.
Figure 13:
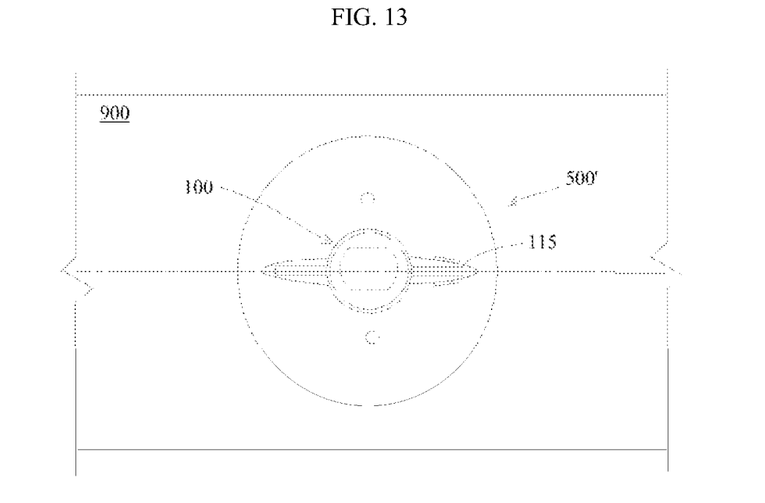
FIG. 13 is a view of a fitment holder in accordance with example embodiments.

FIGS. 11-13 illustrate another example of a fitment holder 500' in accordance with example embodiments. Like fitment holder 500, fitment holder 500' may include a base 510', a hub 520', and a fitment positioning structure 530'. The hub 520', like hub 520, may be sized to match a barrel of the fitment 100 so that the fitment 100 may be secured to the fitment holder 500'. In FIGS. 11-13 the fitment holder 500' is substantially identical to the fitment holder 500 except that in the embodiment of FIGS. 13-15 the fitment positioning structure 530' is comprised of a pair of protrusions protruding from a top surface of the base 510'. The protrusions, in fact, may be integral with the base 510'. Due to the similarities of fitment holder 500' to fitment holder 500 a further description thereof is omitted for the sake of brevity.

Figure 14:
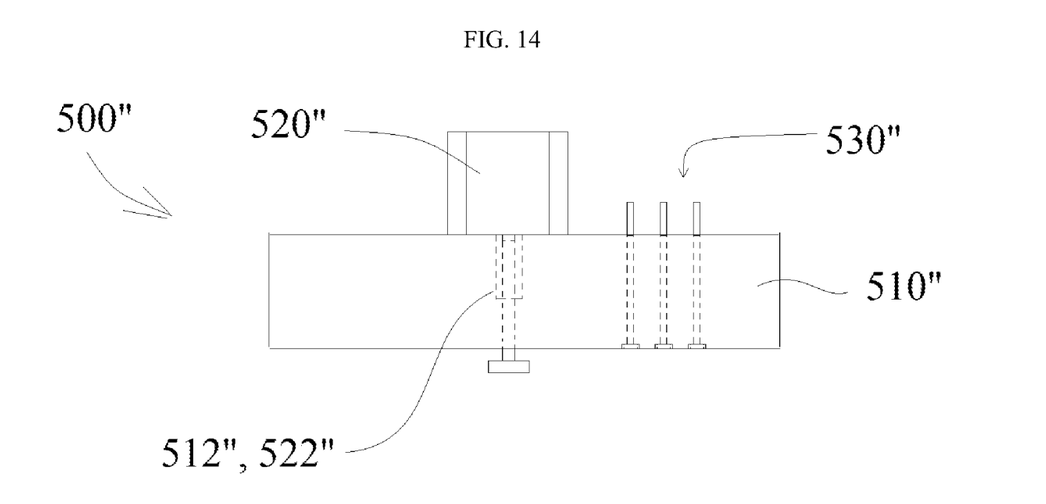
FIG. 14 is a view of a fitment holder in accordance with example embodiments.
Figure 15:
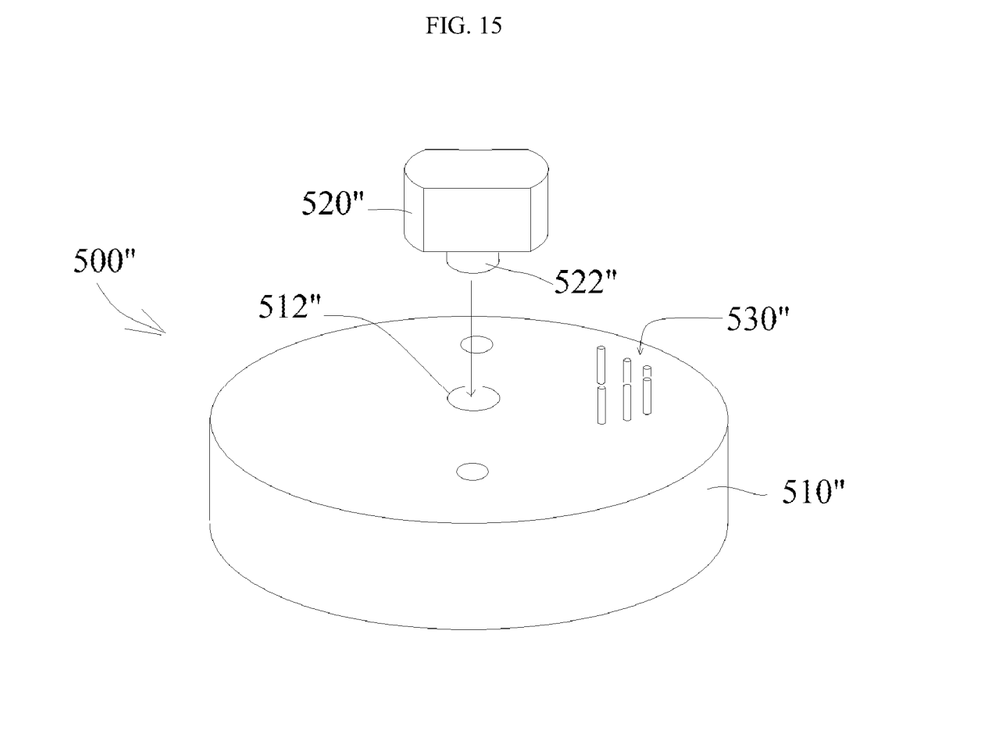
FIG. 15 is a view of a fitment holder in accordance with example embodiments.

FIGS. 14-15 illustrate yet another example of a fitment holder 500" in accordance with example embodiments. Like fitment holder 500, fitment holder 500" may include a base 510", a hub 520", and a fitment positioning structure 530". The hub 520", like hub 520, may be sized to match a barrel of the fitment 100 so that the fitment 100 may be secured to the fitment holder 500". In FIGS. 14-15 the base 510" is illustrated as including a threaded bushing 512" configured to receive a threaded shaft 522" extending from a bottom of the hub 520". In this embodiment, the hub 520" may be attached to the base 510" by executing a screw type action to engage the threads of the shaft 522" with the threads of the bushing 512". In this way, the hub 520" may be removably attached to the base 510". Due to the similarities of fitment holder 500" to fitment holder 500 a further description thereof is omitted for the sake of brevity.

What we claim is:

1. A fitment holder comprising:
   a base;
   a hub extending from the base; and
   a fitment positioning structure comprising a plurality of pins configured to engage a wing of a fitment, the plurality of pins including a plurality of heads residing in a plurality of countersunk areas formed in the base and a plurality of ends extending from a top surface of the base.

2. The fitment holder of claim 1, wherein the base includes a beveled front edge.

3. The fitment holder of claim 1, wherein the base further includes at least one aperture configured to receive at least one screw to attach the fitment holder to a conveyor.

4. A fitment transportation system comprising:
   a conveyer belt;
   the fitment holder of claim 1; and
   at least one connector connecting the fitment holder to the conveyer belt, wherein the plurality of heads are trapped between the base and the conveyor belt.

5. The fitment transportation system of claim 4, wherein the at least one connector is at least one screw configured to penetrate the conveyor belt and insert into an aperture of the base.

6. The fitment transportation system of claim 5, wherein the conveyor belt is sandwiched between a head of the at least one screw and the base.

7. The fitment transportation system of claim 6, wherein a front of the base is beveled.

8. A method of assembling a standup pouch comprising placing a fitment on a fitment holder, wherein placing the fitment on the fitment holder results in a hub of the fitment holder residing in a barrel of the fitment and a wing of the fitment residing in a fitment positioning structure of the fitment holder,
wherein the fitment positioning structure is comprised of a plurality of pins.

9. The method of claim 8, wherein the plurality of pins includes a plurality of heads captured by a plurality of countersunk areas formed in a base of the fitment holder.

10. The method of claim 9, further comprising:
using a conveyor to move the fitment holder from a first location to a second location, wherein the fitment holder is secured to the conveyor.

11. The method of claim 10, wherein the fitment holder is secured to the conveyor by at least one screw.

12. The method of claim 11, wherein the plurality of heads are captured in the countersunk areas by the conveyor.

* * * * *